United States Patent [19]

Layden, Jr. et al.

[11] Patent Number: 4,571,317
[45] Date of Patent: Feb. 18, 1986

[54] PROCESS FOR PRODUCING BINDERLESS CARBON OR GRAPHITE ARTICLES

[75] Inventors: George K. Layden, Jr., Glastonbury; Romeo G. Bourdeau, South Windsor; Roscoe A. Pike, Simsbury, all of Conn.

[73] Assignee: United Technologies Corporation, Hartford, Conn.

[21] Appl. No.: 643,109

[22] Filed: Aug. 23, 1984

Related U.S. Application Data

[63] Continuation of Ser. No. 661,211, Feb. 25, 1976, abandoned, which is a continuation of Ser. No. 481,438, Jun. 20, 1974, abandoned.

[51] Int. Cl.$^4$ ............................................. B32B 7/02
[52] U.S. Cl. ................................ 264/29.1; 264/29.2; 264/29.4; 264/29.7; 264/113; 264/125; 264/DIG. 61; 264/DIG. 75; 423/447.2; 423/448
[58] Field of Search .................... 264/29.2, 29.4, 29.7, 264/113, 125, DIG. 61, DIG. 75; 106/56; 423/447.2, 448

[56] References Cited

U.S. PATENT DOCUMENTS

| | | | |
|---|---|---|---|
| 2,594,226 | 4/1952 | Shea | 264/29.3 |
| 2,789,038 | 4/1957 | Bennett et al. | 264/29.1 |
| 2,796,331 | 6/1957 | Kauffman et al. | 264/29.1 |
| 3,317,338 | 5/1967 | Ratchelov | 156/155 |
| 3,367,812 | 2/1968 | Watts | 156/155 |
| 3,369,920 | 2/1968 | Bourdeau et al. | 156/155 |
| 3,399,969 | 9/1968 | Bokvos et al. | 264/29.1 |
| 3,412,062 | 11/1968 | Johnson et al. | 264/37 |
| 3,462,289 | 8/1969 | Rohl et al. | 264/29.1 |
| 3,533,741 | 10/1970 | Higgins et al. | 264/29.2 |
| 3,552,533 | 1/1971 | Nitz et al. | 264/29.1 |
| 3,558,276 | 1/1971 | Ouani | 264/29.6 |
| 3,660,140 | 5/1972 | Scola et al. | 8/115.5 |
| 3,718,720 | 2/1973 | Lambdin et al. | 264/29.1 |
| 3,720,536 | 3/1973 | Scola et al. | 8/115.5 |
| 3,725,110 | 4/1973 | Rodgers et al. | 264/29.1 |
| 3,914,395 | 10/1975 | Finelli et al. | 423/448 |
| 3,971,669 | 7/1976 | Wrzesien et al. | 264/29.2 |
| 3,991,169 | 4/1976 | Makita et al. | 423/445 |
| 4,064,207 | 12/1977 | DeCresente et al. | 264/29.6 |
| 4,080,413 | 3/1978 | Layden et al. | 264/29.2 |
| 4,115,528 | 9/1978 | Christner et al. | 423/449 |

FOREIGN PATENT DOCUMENTS

| | | |
|---|---|---|
| 911542 | 11/1962 | United Kingdom . |
| 942186 | 11/1963 | United Kingdom . |
| 1122645 | 8/1964 | United Kingdom . |
| 1163979 | 9/1969 | United Kingdom . |

OTHER PUBLICATIONS

"Dev. of High Modulus Carbon Fiber, Tape and Composites", AMMR & CTR-73-20, Arms Mat. & Mech. Res. Center, Watertown, Mass., 30 pages, 16 ins., May, 1973.
Houtz, R. G., Textile Res. J. 20, 786-801, (1950).
Shinda, A., Govt. Ind. Res. Inst., Osaka, Report, 52 pages, (1961).
"High Strength High Modulus Carbon Fibers", Watt et al., The Engineer, 22, 815-816, (1966).
"Det. of Melting of PAN-MMA Copolymer Fibers by DTA", J. Appl. Polymer Sci., 15, pp. 1283-1285, (1971).
"Retrograde Core Forming During Oxid. of PAN Filaments", Layden, G. K., Carbon, 10, pp. 59-63, (1972).

Primary Examiner—Jeffery Thurlow
Attorney, Agent, or Firm—Harry J. Gwinnell

[57] ABSTRACT

A process for producing binderless, single phase bulk carbon or graphite articles having a fibrillar microstructure comprising the steps of assembling a plurality of polymer fibers into a preselected pattern, subjecting them to a temperature and pressure sufficient to cause heat distortion flow and concomitant self-bonding of contiguous fibers and pyrolyzing the fibers in a nonoxidizing atmosphere.

6 Claims, 6 Drawing Figures

PROCESS FOR PRODUCING BINDERLESS CARBON OR GRAPHITE ARTICLES

This is a continuation of Ser. No. 661,211 filed 02/25/76 abandoned, which is a continuation of 481,438, filed June 20, 1974 now abandoned.

BACKGROUND OF THE INVENTION

It is known to pyrolyze organic materials to convert them to useful carbon and graphite articles, the practice dating back at least to the days of Edison. In more recent times, the development of carbon and graphite fibrous materials such as yarn, tow, cloth and felt has progressed at a rapid pace and numerous advances in their manufacture from such various organic fibrous precursors such as acrylic, cellulosic, polyvinyl alcohol, polyamide, polyimide, polyester, polybenzimidazole and the like have been made. In addition to the pyrolysis of fibrous materials, the pyrolysis of bulk resinous materials to produce a variety of glassy and amorphous carbons as well as crystalline carbons and graphites has also proceeded rapidly.

These disciplines overlap in the area of the so-called carbon-carbon and carbon-graphite composites. Carbon-carbon composites are, in general, carbon bodies reinforced with carbon fibers. The method used for the fabrication of these composites is by impregnation of low and high modulus carbon fibers in various forms such as yarn, tow, felt, or cloth in two and three dimensional weaves with a resin, pyrolytic carbon, or combinations of the two. Where a resin is used which may be a pitch or a polymer, the impregnated, cured, or uncured material is pyrolyzed by heating to temperatures sufficiently high to convert the binder to carbon. Where a pyrolytic carbon is used, a fibrous skeleton is impregnated with carbon by the thermal decomposition of a hydrocarbon gas such as methane. Modifications of these processes include reimpregnation of resins into carbonized bodies to increase density and properties, or impregnation of pyrolyzed fiber-carbonized resin composites with pyrolytic carbon to effect the same improvements. During pyrolysis, the matrix shrinks resulting in the development of stresses and/or cracks in the binder and a possible weakening of the bond between the fiber and the matrix. The impregnation of a carbon skeleton with pyrolytic carbon (produced by the thermal decomposition of a hydrocarbon gas) leads to a similar condition which is due to the anisotropic shrinkage of the matrix on cool down from process temperatures (1100° C. to 1300° C.). The above dimensional changes are responsible for the relatively low shear strengths of these materials. With increasing heat treatment temperature and high temperature (2000° C. to 3000° C.) heat treating cycles the dimensional changes in the binder or matrix phase increase leading to further reduction in the shear strength of the material.

The use of nondirectional fiber geometries such as in felted or 3-D weave patterns tends to obscure the above condition to some extent since the purpose of such fiber geometries is to reinforce the material in all directions. However, this scheme does not eliminate the basic problem of dimensional changes in the binder during processing.

A substantial advance could be made in the art of carbon-carbon composites if the problem of differential fiber-matrix dimensional changes could be eliminated. One approach that has been tried with limited success is to employ precursor fibers or partially carbonized fibers in a resin matrix instead of fully carbonized fibers in an attempt to match the shrinkage of the fibers to the matrix during pyrolysis.

This invention takes a markedly different approach to solving problems of fiber-matrix interactions, namely the elimination of the matrix entirely, and relies instead upon the plasticity of suitable precursor fibers to effect fiber bonding by a compression molding step prior to pyrolysis. In this way the strength and stiffness of carbon fibers can be exploited to produce articles having properties tailored to specific end uses, without introducing weaknesses associated with fiber-matrix interaction.

SUMMARY OF THE INVENTION

The present invention relates, in general, to the production of carbon or graphite articles by the pyrolysis of polymeric materials and in particular to the production of binderless, single phase bulk carbon or graphite articles having a fibrillar microstructure by the pyrolysis of a plurality of consolidated polymeric fibers without the addition of a matrix material.

The invention contemplates a process for producing bulk carbon or graphite articles having a fibrillar microstructure comprising the steps of assembling a plurality of synthetic polymer fibers in a preselected pattern, subjecting said assembled fibers simultaneously to a temperature and pressure sufficient to cause heat distortion flow and concomitant bonding between contiguous fibers and pyrolyzing said bonded fibers in a nonoxidizing atmosphere at a temperature of 650° C.–3500° C. For the purposes of the present invention, the term heat distortion flow is defined to mean flow greater than that which occurs at the heat distortion temperature (ASTM prodedure D648-56) but less than that which occurs at the polymer melting point. Although the range of useful temperatures and pressures will vary depending on various factors such as size, shape and composition of the synthetic polymer selected, atmosphere, porosity desired, etc., a general range of temperatures of about 100° C.–800° C., preferably below 500° C., and of pressures of about 15–5,000 psi, preferably below 4,000 psi, are considered satisfactory. Of course, it will be recognized that the consolidation parameters selected must also be low enough so that the structural integrity of the product will be maintained during pyrolysis. For pyrolysis, a temperature of 900° C.–1000° C. is normally sufficient to carbonize the fibers, while a temperature of 2500° C.–3000° C. is normally suitable for graphitizing.

Depending on the particular synthetic polymer fiber used, a stabilization step, consisting of isothermally heating for extended periods in air or other atmosphere prior to pyrolysis may be employed in addition to the aforementioned steps. This oxidation treatment may be employed prior to compaction and bonding of the fiber array, or subsequent thereto, or both. For acrylic copolymers, oxidation treatment preferably comprises heating in an oxidizing atmosphere at a temperature of 200° C.–500° C. until the fibers have an oxygen content of not more than approximately 10 weight percent.

DESCRIPTION OF THE PREFERRED EMBODIMENT

Figure 1:
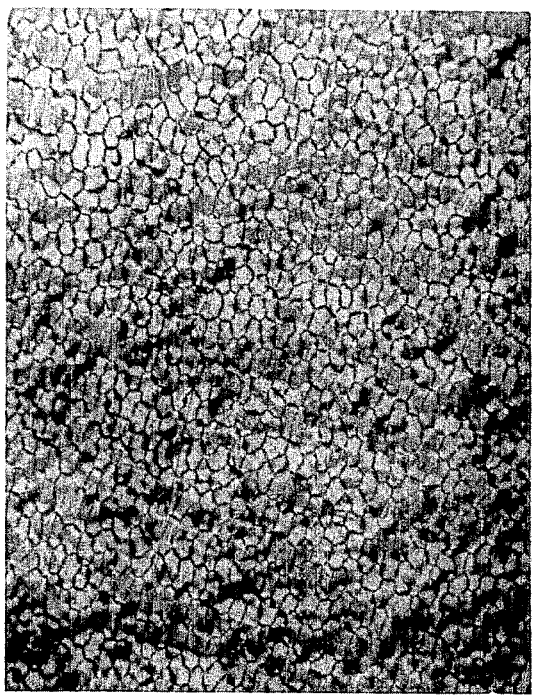
FIG. 1 is a photomicrograph of the cross section of a unidirectionally oriented hot pressed and pyrolyzed carbon article magnified 200 times made from acrylic fibers according to the present invention.

The inventive process is applicable to synthetic polymer materials in fiber form, i.e., yarns, fabrics and filaments and is useful in producing binderless, single phase bulk carbon or graphite articles having a variety of uses. Suitable synthetic polymer materials are preferably (1) acrylonitrile polymers including homopolymers, copolymers, terpolymers, graft polymers and the like containing at least 50 percent acrylonitrile, preferably at least 80 percent acrylonitrile and (2) aromatic polycyclic such as polybenzimidazoles, polythiadiazoles, the aromatic polyamides and the aromatic polyimides. Other materials, capable of being converted to carbon fiber may also be utilized. Synthetic polymer materials, for example, such as polyvinyl alcohol, polyvinyl chloride, polymethyl vinylketone and the like, as well as naturally occurring materials such as coal tar, and pitch may also be used.

With regard to stabilization of the acrylic polymers, an oxidation treatment comprising heating in an oxidizing atmosphere at a temperature of 200° C.–500° C. until the fibers have an oxygen content, by weight, of not over 15 percent, preferably not over approximately 10 percent and most preferably 8 percent. It has been shown that such oxidation treatment alters the polymer chemistry so as to render the fibers essentially nonmelting. The melting endotherm observed during differential analysis of acrylic copolymers is suppressed when the oxygen content exceeds about five weight percent. However, some thermoplasticity is still exhibited by oxidized acrylic fiber containing up to approximately 10 weight percent oxygen which permits them to be consolidated into various configurations by the application of heat and pressure. The introduction of 15 weight percent oxygen is approximately the amount necessary to completely stabilize the material and thus eliminate the 325° C. reaction exotherm altogether. More than 15 percent oxygen is not useful and is possibly deleterious to processing and resulting properties. Polyacrylonitrile containing 15 percent oxygen, while suitable under limited conditions, has relatively lower plasticity and bondability during hot pressing when compared to polyacrylonitrile containing a lower amount of oxygen. In most cases, the various synthetic acrylic polymer fibers can be pretreated in order to achieve sufficient oxygen content or stabilization by an exposure to an oxidizing atmosphere at a temperature of 200°–300° C., for a time depending on the particular fiber selected. Other fibers, such as polybenzimidazole require no pretreatment.

The step of consolidation is of primary importance in achieving a well-bonded, high strength structure in the carbon or graphite articles. Heat and pressure, prior to pyrolysis is applied to the assembled precursor fibers in such a way that the individual fibers become bonded together. This may involve a distortion of the original fiber shape. For example, when originally round fibers are unidirectionally oriented and consolidated by applying pressure in a direction normal to the filament axis, the highest bonding is achieved when the individual fibers distort into a hexagonal shape, since in doing so, void volume is eliminated and maximum fiber-fiber contact area is established. Bonding may be effected by one of several techniques, such as by hot pressing or by hot rolling.

The optimum conditions of temperature and pressure for hot pressing vary widely from precursor to precursor and for some precursors (such as certain acrylic copolymers) depending upon the degree of prepressing stabilization (such as oxidation) to which the fibers have been subjected. It will be appreciated therefore that optimum conditions must be separately established for each precursor. In general, however, every assemblage of fibers is subjected to a temperature and pressure sufficient to cause heat distortion flow and concomitant bonding between contiguous fibers. For the purposes of the present invention, the term heat distortion flow is defined to mean flow greater than that which occurs at the heat distortion temperature (ASTM procedure D648-56) but less than that which occurs at the polymer melting point. Although the range of useful temperatures and pressures will vary depending on various factors such as size, shape and composition of the synthetic polymer selected, atmosphere, porosity desired, etc., a general range of temperatures of about 100° C.–800° C., preferably below 500° C., and of pressures of about 15–5,000 psi, preferably below 4,000 psi, are considered satisfactory. Of course, it will be recognized that the consolidation parameters selected must also be low enough so that the structural integrity of the product will be maintained during pyrolysis.

After consolidation, the article is pyrolyzed in the conventional manner. In general, pyrolysis is conducted by heating in a protective atmosphere, e.g., argon, at a temperature of 900° C.–3500° C., preferably 900° C.–1000° C. for carbonization and 2500° C.–3000° C. for graphitization.

The following specific examples are illustrative of the invention.

EXAMPLE 1

A sample of acrylic copolymer tow of total denier of about 8700 and a composition consisting of approximately 90 percent acrylonitrile and 10 percent copolymer similar to that sold by Chemstrand Division of Monsanto Corporation under the trade name "Acrilan" was heated in air at a temperature of 230° C. for five hours, the oxidation combining about 8 percent oxygen. Lengths of the oxidized tow were carefully aligned in a graphite mold and consolidated in air at a nominal temperature of 270° C. and a pressure of 3,750 psi for a ten minute soak period. The consolidated bar, having dimensions of 1.25 inches×0.138 inch×0.093 inch was heated in an argon atmosphere at atmospheric pressure to 1200° C. at a rate of about 40° C. per hour. After cooling to room temperature the bar was tested in three point bending and found to have a modulus of rupture of 45,000 psi. A photomicrograph of the cross-sectional microstructure of the pyrolyzed bar is shown in FIG. 1.

EXAMPLE 2

A bar similar to that described in Example 1 was further heated to 1700° C. in argon at a rate of approximately 500° C. per hour. This bar exhibited a modulus of rupture of 70,000 psi and a Young's modulus of 25,000,000 psi.

EXAMPLE 3

A bar similar to that described in Example 1 was further heated to 2000° C. in argon, again at about 500° C. per hour. This bar exhibited a modulus of rupture of 83,000 psi and a Young's modulus of 33,000,000 psi.

EXAMPLE 4

A bar similar to that described in Example 1 was heated further to 2300° C. in argon. This bar exhibited a modulus of rupture of 83,000 psi and a Young's modulus of 50,000,000 psi.

EXAMPLE 5

Figure 2:
FIG. 2 is a scanning electron micrograph of a fracture surface showing the microstructure of a dense uniaxially hot pressed and pyrolyzed chopped acrylic fiber compact magnified 500 times made according to the present invention.

Precursor fiber oxidized as described in Example 1 was cut into short lengths having a mode of approximately ten mils using a Thomas-Wiley cutting mill. A sample of this material was placed in a graphite mold and compacted in air at 2,500 psi at 270° C. for approximately 20 minutes to produce a consolidated bar having the same dimensions as that of Example 1. The bar was subsequently pyrolyzed by heating at a rate of 100° C. per hour to 1,200° C. in an argon atmosphere. The resulting carbon bar had an apparent porosity of about 5 percent, and exhibited a modulus of rupture of 20,000 psi. A scanning electron micrograph of the fracture surface of a similar test bar is shown in FIG. 2.

EXAMPLE 6

A bar similar to that described in Example 5, except compacted at a pressure of 600 psi had a porosity of about 30 percent, and a modulus of rupture of 7,000 psi.

EXAMPLE 7

A bar similar to that described in Example 5, except compacted at a pressure of 150 psi had a porosity of 56 percent and a modulus of rupture of 2,000 psi.

EXAMPLE 8

Figure 3:
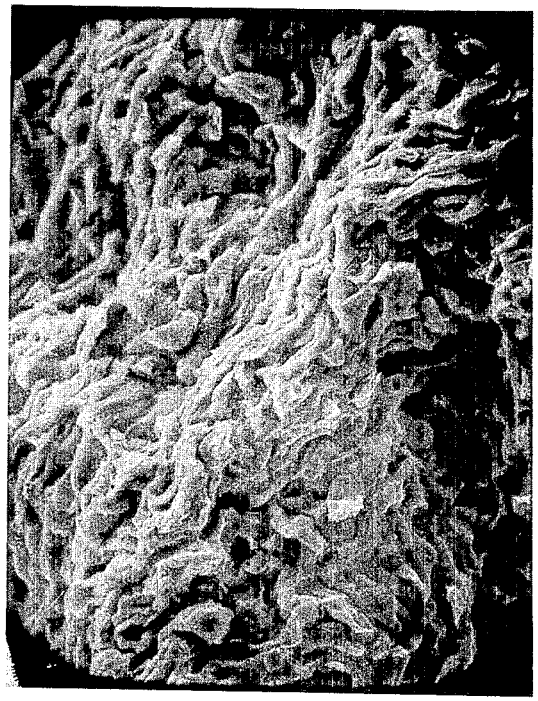
FIG. 3 is a scanning electron micrograph of a fracture surface of a dense isostatically hot pressed and pyrolyzed chopped acrylic fiber compact magnified 500 times and made according to the present invention.

Chopped precursor material similar to that described in Example 5 was placed inside a VITON rubber sleeve and isostatically compacted in an autoclave at 270° C. and 3,750 psi for approximately 15 minutes, using DOWTHERM as the heat and pressure transfer medium. The compacted bar was subsequently pyrolyzed by heating to 1,500° C. at a rate of 100° C. per hour in an atmosphere of argon. The resulting carbon bar had a porosity of approximately 2 percent and a modulus of rupture of 10,500 psi. A scanning electron micrograph of the fracture surface of this sample is shown as FIG. 3.

EXAMPLE 9

Figure 4:
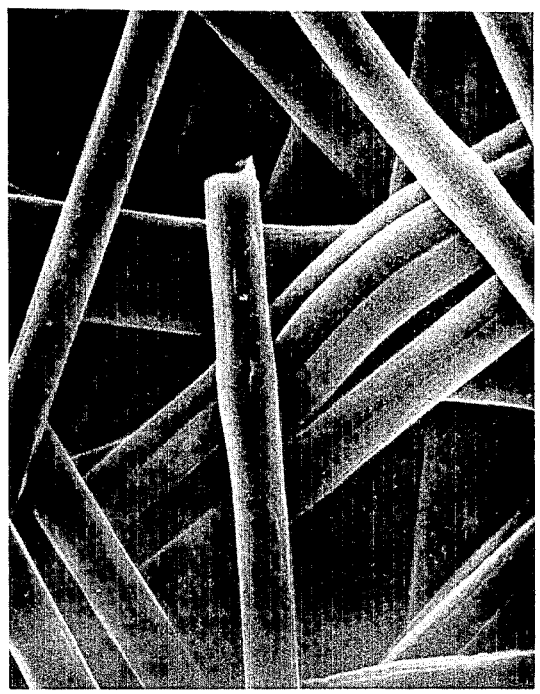
FIG. 4 is a scanning electron micrograph of a carbon felt magnified 500 times made by the pyrolysis of a pressure bonded felt of chopped acrylic fiber according to the present invention.

Precursor material similar to that described in Example 1 was cut into lengths of approximately 0.1 inch. Samples of this chopped fiber were dispersed in water containing a small amount of glycerine. The dispersion was placed in a Buchner funnel over a teflon coated glass filter paper, and suction applied to pull off the water leaving a felt of the precursor fibers. The felt was air dried and transferred to a 3.2 inch right cylindircal carbon mold and pressed in a preheated oven at 285° C. for ten minutes at 50 psi. The pressure bonded felt was then pyrolyzed by heating in an argon atmosphere to 1260° C. at a rate of 100° C. per hour. The resulting carbon felt had a microstructure shown in the scanning electron micrograph, FIG. 4, and properties as set forth below:

Porosity (mercury intrusion): 71%
Mean pore size: $59\mu$
Pore size range: $5-118\mu$
Resistivity: 0.019 ohm-cm

EXAMPLE 10

Figure 5:
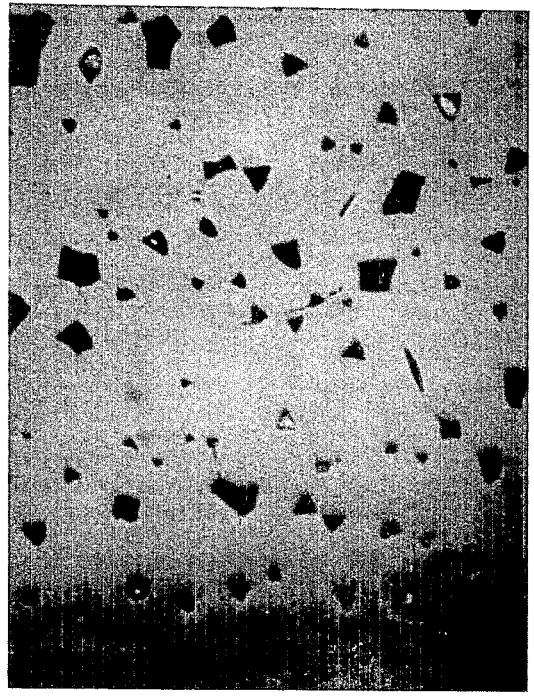
FIG. 5 is a photomicrograph of a carbon article magnified 500 times, made from hot pressed and pyrolyzed polybenzimidazole fiber according to the present invention.

Continuous filament polybenzimidazole (PBI) yarn strands developed by Celanese Research Corporation under contract to the Air Force Materials Laboratory were unidirectionally oriented in graphite molds and compacted at a pressure of 1680 psi, at a temperature of 408° C. for 30 minutes, pyrolyzed by heating in argon atmosphere at a rate of 50° C. per hour to 1230° C. The resulting carbon article exhibited well-controlled unidirectionally oriented porosity and excellent interfiber bond formation as illustrated in FIG. 5.

EXAMPLE 11

Figure 6:
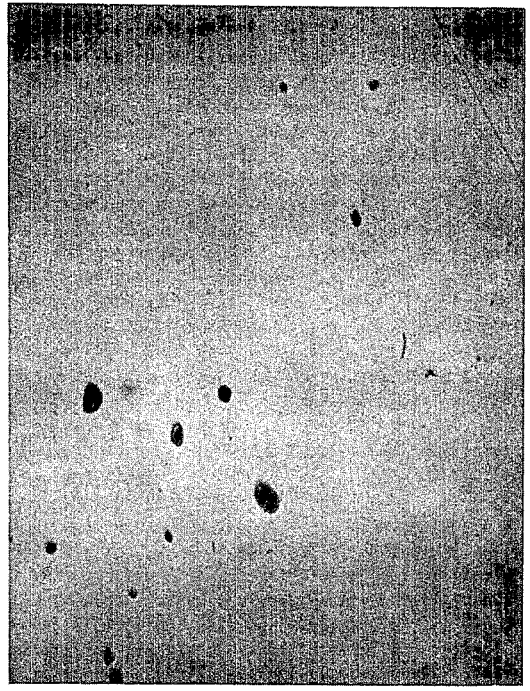
FIG. 6 is a photomicrograph of a carbon article magnified 500 times made from hot-pressed, post-cured and pyrolyzed polybenzimidazole fiber according to the present invention.

Unidirectionally oriented PBI fibers were compacted in a graphite mold at a temperature of 440° C. and a pressure of 1,680 psi for one-half hour. The temperature of the mold was then reduced to 390° C. and held for seven hours in order to post-cure the consolidated structure prior to pyrolysis. The article was then pyrolyzed as in Example 10. The transverse microstructure of the bonded, post-cured and pyrolyzed article is shown in FIG. 6.

What has been set forth above is intended primarily as exemplary to enable those skilled in the art in the practice of the invention and it should therefore be understood that, within the scope of the appended claims, the invention may be practiced in ways other than as specifically described.

What is claimed is:

1. A process for producing binderless, single phase bulk carbon or graphite articles having a fibrillar microstructure comprising the steps of:

assembling a plurality of thermally stable, organic polymer fibers into a unidirectional pattern, said fibers being selected from the group consisting of (1) acrylonitrile polymers including the homopolymers and copolymers, terpolymers and graft polymers containing at least 50 percent acrylonitrile, (2) aromatic polycyclic polymers (3) polyvinyl alcohol, (4) polyvinyl chloride, (5) polymethyl vinylketone (6) coal tar and (7) pitch;

consolidating said assembled fibers by subjecting them simultaneously to a temperature and pressure sufficient to cause heat distortion flow and self-bonding of contiguous fibers, said temperature being in the range of 100°-500° C. and said pressure being in the range of 15-4,000 psi (0.103-27.5 MPa); and pyrolizing said fibers to carbon or graphite in a non-oxidizing atmosphere at a temperature of 650° C.-3500°

C. to produce an article with a Young's modulus of at least $2.5 \times 10^7$ psi (172 GPa).

2. The process of claim 1 wherein said polymer fibers are acrylic copolymer and are stabilized by heating in an oxidizing atmosphere at a temperature of 200° C.-500° C. until said fibers have an oxygen content of not over approximately 10 weight percent.

3. The process of claim 1 wherein said polymer fibers are polybenzimidazole.

4. A process for producing binderless, single phase bulk carbon or graphite articles having fibrillar microstructure comprising the steps of:

assembling a plurality of thermally stable two or three dimensionally oriented short-length organic polymer fibers into a bulk shape, said fibers being selected from the group consisting of (1) acrylonitrile polymers including the homopolymer and copolymers, terpolymers and graft polymers containing at least 50 percent acrylonitrile, (2) aromatic polycyclic polymers, (3) polyvinyl alcohol, (4) polyvinyl chloride, (5) polymethyl vinylketone, (6) coal tar, and (7) pitch;

consolidating said assembled fibers by subjecting them simultaneously to a temperature and pressure sufficient to cause heat distortion flow and self-bonding of contiguous fibers, said temperature being in the range of 100°-500° C. and said pressure being in the range of 15-4,000 psi (0.103-27.5 MPa); and pryrolizing said fibers to carbon or graphite in a non-oxidizing atmosphere at a temperature of 650° C.-3500° C. to produce an article with a modulus of rupture of at least 7000 psi (48.2 MPa).

5. The process of claim 4 wherein said polymer fibers are acrylic copolymer fibers and are stabilized by heating in an oxidizing atmosphere at a temperature of 200° C.-500° C. until said fibers have an oxygen content of not over approximately 10 weight percent.

6. The process of claim 4 wherein said polymer fibers are polybenzimidazole.

* * * * *